US011183678B2

(12) United States Patent
Fukutomi et al.

(10) Patent No.: US 11,183,678 B2
(45) Date of Patent: Nov. 23, 2021

(54) ELECTRODE FOR NONAQUEOUS ELECTROLYTE SECONDARY BATTERY AND NONAQUEOUS ELECTROLYTE SECONDARY BATTERY

(71) Applicant: SANYO Electric Co., Ltd., Daito (JP)

(72) Inventors: Yuta Fukutomi, Osaka (JP); Motoki Kinugawa, Kyoto (JP); Tomofumi Yanagi, Osaka (JP)

(73) Assignee: SANYO Electric Co., Ltd., Daito (JP)

( * ) Notice: Subject to any disclaimer, the term of this patent is extended or adjusted under 35 U.S.C. 154(b) by 71 days.

(21) Appl. No.: 16/347,988

(22) PCT Filed: Oct. 25, 2017

(86) PCT No.: PCT/JP2017/038432
§ 371 (c)(1),
(2) Date: May 7, 2019

(87) PCT Pub. No.: WO2018/088204
PCT Pub. Date: May 17, 2018

(65) Prior Publication Data
US 2019/0267611 A1    Aug. 29, 2019

(30) Foreign Application Priority Data

Nov. 10, 2016    (JP) .............................. JP2016-219346

(51) Int. Cl.
*H01M 4/13* (2010.01)
*H01M 4/36* (2006.01)
(Continued)

(52) U.S. Cl.
CPC ............. *H01M 4/13* (2013.01); *H01M 4/364* (2013.01); *H01M 4/621* (2013.01); *H01M 4/70* (2013.01);
(Continued)

(58) Field of Classification Search
None
See application file for complete search history.

(56) References Cited

U.S. PATENT DOCUMENTS

2012/0121955 A1* 5/2012 Endo ..................... H01M 4/621
                                                              429/94
2013/0022867 A1* 1/2013 Suzuki ..................... H01M 4/13
                                                              429/211
(Continued)

FOREIGN PATENT DOCUMENTS

JP           2006-54115 A       2/2006
JP           2014-132541 A      7/2014
(Continued)

OTHER PUBLICATIONS

International Search Report dated Jan. 30, 2018, issued in counterpart International Application No. PCT/JP2017/038432 (1 page).

*Primary Examiner* — Ula C Ruddock
*Assistant Examiner* — Sarika Gupta
(74) *Attorney, Agent, or Firm* — Westerman, Hattori, Daniels & Adrian, LLP

(57) ABSTRACT

An electrode for a nonaqueous electrolyte secondary battery that is less likely to cause loss of a mixture layer and that can ensure good cycle characteristics of the battery. An electrode for a nonaqueous electrolyte secondary battery of an exemplary embodiment includes a rectangular current collector and a mixture layer that contains an active material and a binder and that is formed on the current collector. The mixture layer covers at least one edge of four linear peripheral edges of the current collector, and the binder content in the mixture layer has a maximum value at a position 0.5 mm to 5.5 mm away from the one edge in a second direction that is perpendicular to a first direction along the one edge. The (Continued)

maximum value is more than 100% and 240% or less of the binder content at the center in the second direction of the mixture layer.

4 Claims, 5 Drawing Sheets

(51) Int. Cl.
    *H01M 4/62*     (2006.01)
    *H01M 4/70*     (2006.01)
    *H01M 10/0587*     (2010.01)
    *H01M 10/0585*     (2010.01)

(52) U.S. Cl.
    CPC ... *H01M 10/0585* (2013.01); *H01M 10/0587* (2013.01)

(56) References Cited

U.S. PATENT DOCUMENTS

2015/0280209 A1    10/2015   Ohara et al.
2016/0056467 A1*   2/2016   Song .................... H01M 4/622
                                                                 429/217

FOREIGN PATENT DOCUMENTS

WO      2011/142083 A1    11/2011
WO      2014/073113 A1    5/2014

* cited by examiner

ELECTRODE FOR NONAQUEOUS ELECTROLYTE SECONDARY BATTERY AND NONAQUEOUS ELECTROLYTE SECONDARY BATTERY

TECHNICAL FIELD

The present disclosure relates to an electrode for a nonaqueous electrolyte secondary battery and to a nonaqueous electrolyte secondary battery.

BACKGROUND ART

A nonaqueous electrolyte secondary battery includes an electrode assembly formed by stacking a positive electrode and a negative electrode via a separator. Each of a positive electrode and a negative electrode that constitute an electrode assembly is typically manufactured by forming a mixture layer on an elongated current collector and cutting, into a predetermined shape, the current collector in the portion where the mixture layer has been formed. When a binding force of the mixture layer to the current collector is weak, the mixture layer is predicted to be lost at the end of the current collector in the cutting step or in the subsequent manufacturing step for a battery, thereby causing problems, such as a reduction in battery capacity and the occurrence of an internal short circuit. Meanwhile, simply increasing the amount of a binder in a mixture layer is not preferable since a decreased amount of an active material in the mixture layer leads to a reduction in battery capacity.

In view of these aspects, Patent Literature (PTL) 1, for example, discloses a method of increasing the binder content in a mixture slurry that is applied to a cutting portion, relative to the binder content in a mixture slurry that is applied to a non-cutting portion, i.e., a portion not to be cut. Moreover, PTL 2 discloses an electrode including a first electrode layer and a second electrode layer that has a higher binder content than the first electrode layer, where the second electrode layer is disposed to come into contact with the surface of a current collector and the side surface of the first electrode layer.

CITATION LIST

Patent Literature

PTL 1: Japanese Published Unexamined Patent Application No. 2006-54115
PTL 2: International Publication No. 2011/142083

SUMMARY OF INVENTION

Technical Problem

According to the techniques disclosed in PTL 1 and 2, it is deemed possible to suppress loss of a mixture layer at the end of a current collector. However, locally increasing the binder content in a mixture layer at the edge of a current collector is revealed to cause a problem in which cycle characteristics of a battery deteriorate.

Solution to Problem

An electrode for a nonaqueous electrolyte secondary battery of an embodiment of the present disclosure is characterized by including a rectangular current collector and a mixture layer that contains an active material and a binder and that is formed on the current collector, where: the mixture layer covers at least one edge of four linear peripheral edges of the current collector; the content of the binder in the mixture layer has a maximum value at a position 0.5 mm to 5.5 mm away from the one edge in a second direction that is perpendicular to a first direction along the one edge; and the maximum value is more than 100% and 240% or less of the content of the binder at the center in the second direction of the mixture layer.

A nonaqueous electrolyte secondary battery of an embodiment of the present disclosure is characterized by including a rolled electrode assembly formed by stacking a positive electrode and a negative electrode via a separator, where at least one of the positive electrode or the negative electrode is formed from the above-described electrode for a nonaqueous electrolyte secondary battery.

Advantageous Effects of Invention

By using an electrode for a nonaqueous electrolyte secondary battery of the embodiment of the present disclosure, it is possible to provide a nonaqueous electrolyte secondary battery that is less likely to cause loss of a mixture layer and that has excellent cycle characteristics.

DESCRIPTION OF EMBODIMENTS

In an electrode for a nonaqueous electrolyte secondary battery of the embodiment of the present disclosure, the binder content in a mixture layer is locally increased at a position 0.5 mm to 5.5 mm away from at least one edge of a rectangular current collector. In addition, a maximum value of the content is adjusted to be more than 100% and 240% or less of the binder content at the center in a second direction (a direction perpendicular to a first direction along the one edge) of the mixture layer. Consequently, loss of the mixture layer in the cutting step of the electrode or in the subsequent manufacturing step for a battery is suppressed, and a nonaqueous electrolyte secondary battery having excellent cycle characteristics is obtained.

Figure 5:
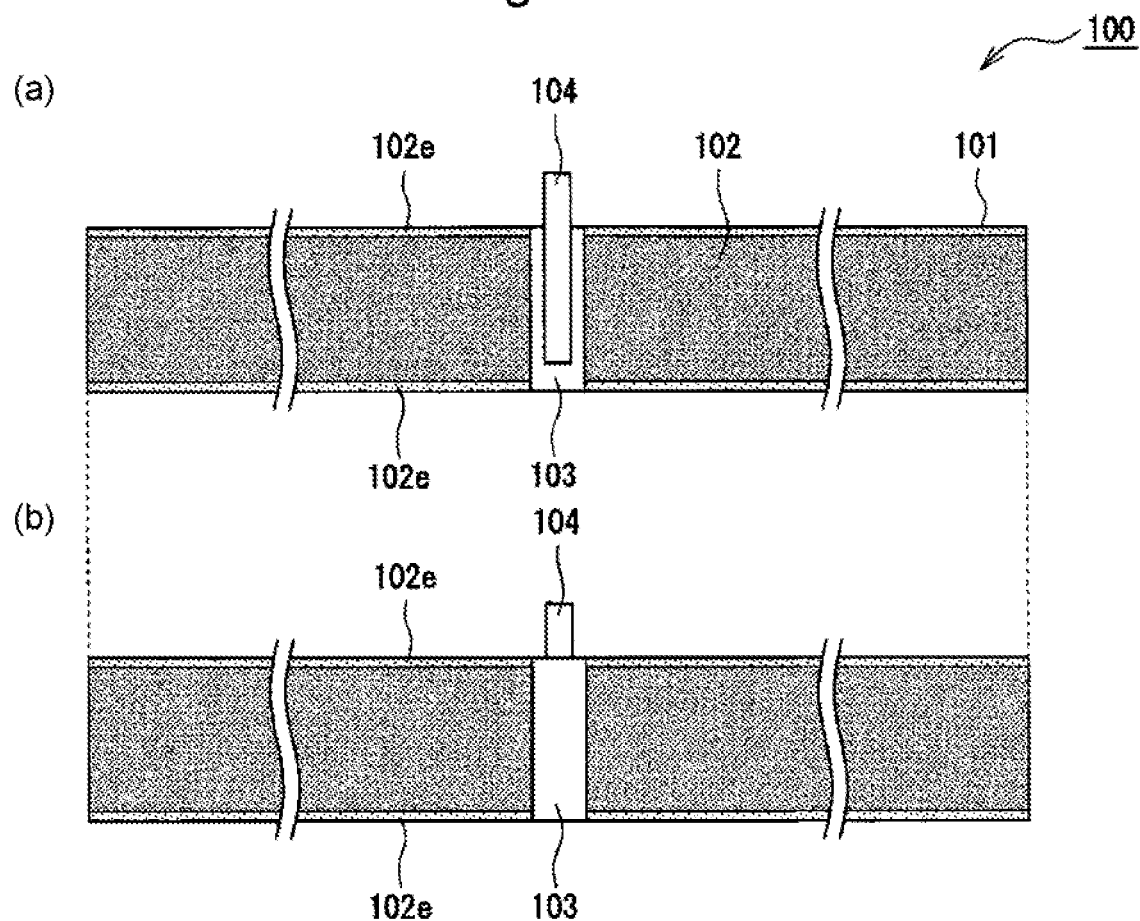
FIG. 5 illustrates an exemplary conventional electrode for a nonaqueous electrolyte secondary battery.

FIG. 5 is a front view and a rear view of a conventional electrode for a nonaqueous electrolyte secondary battery 100. As illustrated in FIG. 5, in the electrode for a nonaqueous electrolyte secondary battery 100, a mixture layer 102 is formed in the entire region of a current collector 101 except for an exposed portion 103 to which a lead 104 is welded. In the mixture layer 102, regions 102e having a higher binder content than the other region exist. Each region 102e is formed to have a width of about several millimeters from the edge in the width direction of the current collector 101 and is formed in the longitudinal direction of the current collector. As a result of the investigation by the present inventors, cycle characteristics of a battery were found to deteriorate in a case of using an electrode having an increased binder content in a mixture layer at the edges of the current collector as in the electrode 100, relative to a case of using an electrode having an almost uniform binder content.

When the electrode 100 is used, cycle characteristics of a battery presumably deteriorate since an electrolyte solution is blocked at the edges of the electrode (electrode assembly) by the regions 102e having an increased binder content, and its permeation inside the electrode assembly becomes difficult. In an electrode for the nonaqueous electrolyte secondary battery of the embodiment of the present disclosure, loss of a mixture layer can be suppressed without interfering with permeation of an electrolyte solution from the edge of the electrode by increasing the binder content at a position 0.5 mm to 5.5 mm away from the edge of a current collector. Consequently, it is deemed possible to maintain good permeability of the electrolyte solution and ensure good cycle characteristics of a battery. However, in this case too, cycle characteristics were found to deteriorate as in the case of using the electrode 100 when a maximum value of the binder content is increased excessively.

Hereinafter, exemplary embodiments will be described in detail.

Since the drawings that will be referred to in the description of the embodiments are schematically illustrated, specific dimensions and the like of each component should be determined by taking into account the following description. The term "almost" is explained by using "almost the same" as an example. Use of this term herein is intended to encompass not only a thing that is identical, but also a thing that is considered to be substantially the same. Moreover, the term "end" means the edge and the vicinity of the edge of an object, and the term "central portion" means the center and the vicinity of the center of an object.

In an electrode for a nonaqueous electrolyte secondary battery of the embodiment of the present disclosure, the mixture layer may cover at least one edge of four linear peripheral edges of a rectangular current collector. In an electrode for a nonaqueous electrolyte secondary battery of the embodiment of the present disclosure, the binder content in a mixture layer has a maximum value at a position 0.5 mm to 5.5 mm away from the one edge in a second direction that is perpendicular to a first direction along the one edge. In the description of the embodiment, a case in which the first direction is the longitudinal direction of a current collector and the second direction is the width direction of the current collector is illustrated. However, the first direction may be the width direction of a current collector, or the lengths in the first direction and the second direction of a current collector may be almost the same.

Hereinafter, a nonaqueous electrolyte secondary battery 10 that is a cylindrical battery including a cylindrical metal case will be illustrated as an exemplary embodiment, but a nonaqueous electrolyte secondary battery of the present disclosure is not limited to a cylindrical battery. A nonaqueous electrolyte secondary battery of the present disclosure may be, for example, a square battery including a square metal case or a laminate battery including a resin sheet package. Further, a rolled electrode assembly 14 formed by rolling a positive electrode and a negative electrode via a separator will be illustrated as an electrode assembly that constitutes a nonaqueous electrolyte secondary battery, but the electrode assembly is not limited to a rolled electrode assembly. The electrode assembly may be a stacked electrode assembly formed by alternately stacking a plurality of positive electrodes and a plurality of negative electrodes via separators, for example.

Figure 1:
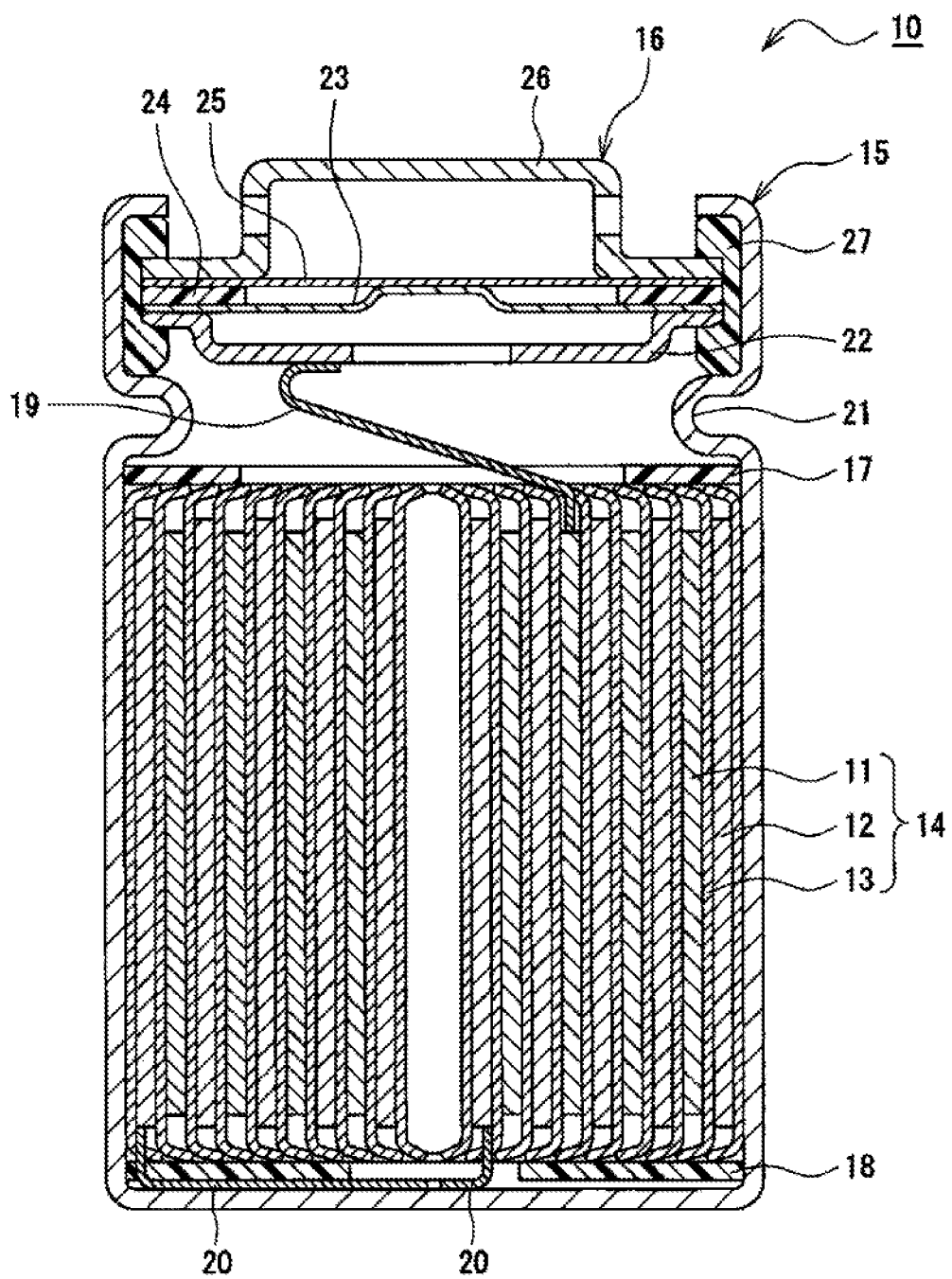
FIG. 1 is a cross-sectional view of a nonaqueous electrolyte secondary battery of an exemplary embodiment.

FIG. 1 is a cross-sectional view of a nonaqueous electrolyte secondary battery 10. As illustrated in FIG. 1, the nonaqueous electrolyte secondary battery 10 includes a rolled electrode assembly 14 and a nonaqueous electrolyte (not shown). The electrode assembly 14 includes a positive electrode 11, a negative electrode 12, and a separator 13, where the positive electrode 11 and the negative electrode 12 are spirally rolled via the separator 13. The nonaqueous electrolyte contains a nonaqueous solvent and an electrolyte salt dissolved in the nonaqueous solvent. The nonaqueous electrolyte is not limited to a liquid electrolyte and may be a solid electrolyte, such as a gel polymer. Hereinafter, one side in the axial direction of the electrode assembly 14 is referred to as "the upper side" and the other side in the axial direction is referred to as "the lower side" in some cases.

All of the positive electrode 11, the negative electrode 12, and the separator 13 that constitute the electrode assembly 14 are formed as strips and rolled spirally to be stacked alternately in the radial direction of the electrode assembly 14. In the electrode assembly 14, the longitudinal direction of each electrode is the rolling direction and the width direction of each electrode is the axial direction. A positive electrode lead 19 that electrically connects the positive electrode 11 to a positive electrode terminal is provided, for example, at almost the center between the inner rolling end and the outer rolling end of the electrode assembly 14 and protrudes from the upper edge of the electrode group. Negative electrode leads 20 that electrically connect the negative electrode 12 to a negative electrode terminal are provided, for example, at the inner rolling end of the electrode assembly 14 and at the outer rolling end of the electrode assembly 14 and protrude from the lower edge of the electrode group.

In the example illustrated in FIG. 1, a case body 15 and a seal 16 constitute a metal battery case that houses the electrode assembly 14 and the nonaqueous electrolyte. On the upper side and the lower side of the electrode assembly 14, insulating plates 17 and 18 are respectively provided. The positive electrode lead 19 is extended in a through hole of the insulating plate 17 to the side of the seal 16 and welded to the lower surface of a filter 22, which is a bottom plate of the seal 16. In the nonaqueous electrolyte secondary battery 10, a cap 26, which is a top plate of the seal 16 electrically connected to the filter 22, constitutes a positive electrode terminal. Meanwhile, each negative electrode lead 20 is extended to the bottom side of the case body 15 and welded to the bottom inner surface of the case body 15. In the nonaqueous electrolyte secondary battery 10, the case body 15 constitutes a negative electrode terminal.

The case body 15 is a flat-bottomed cylindrical metal container. Between the case body 15 and the seal 16, a gasket 27 is provided to ensure sealing of the inside of the battery case. The case body 15 has an overhang 21 that is formed, for example, by pressing the side surface from the outside and that supports the seal 16. The overhang 21 is preferably formed circularly in the circumferential direction of the case body 15 and supports the seal 16 by its upper surface.

The seal 16 has a stacked structure of the filter 22, a lower valve 23, an insulator 24, an upper valve 25, and the cap 26 in this order from the side of the electrode assembly 14. Each member that constitutes the seal 16 has a disk or ring shape, for example, and the members excluding the insulator 24 are electrically connected to each other. The lower valve 23 and the upper valve 25 are connected to each other in the respective central portions, and the insulator 24 is disposed between the peripheries of these valves. Since a vent is provided in the lower valve 23, when the internal pressure of the battery increases due to abnormal heat generation, the upper valve 25 swells to the side of the cap 26 and moves away from the lower valve 23, thereby breaking electrical connection between these valves. When the internal pressure further increases, the upper valve 25 is broken, thereby releasing gas from an opening of the cap 26.

Figure 2:
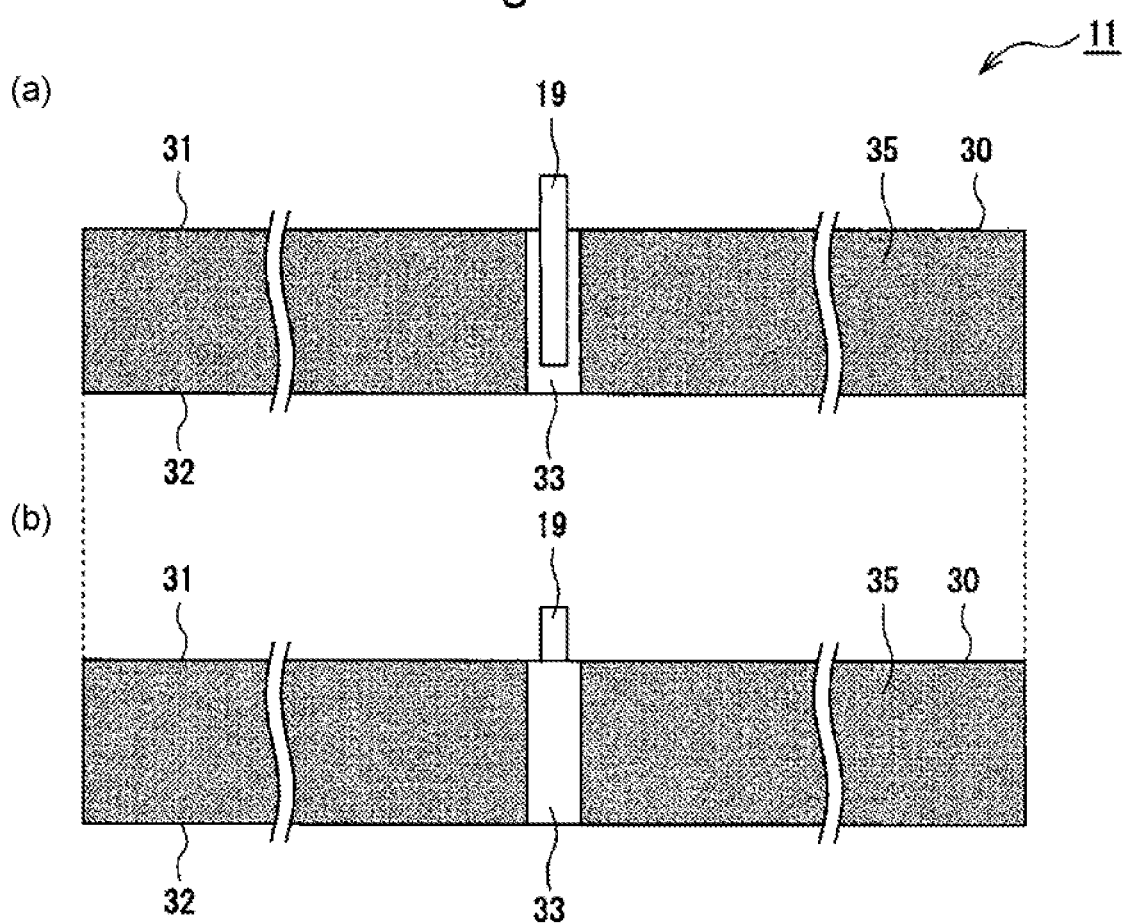
FIG. 2 is a front view and a rear view of a positive electrode of the exemplary embodiment.

Hereinafter, the configuration of the positive electrode 11 will be described in detail with reference to FIG. 2. FIG. 2 is the front view and the rear view of the positive electrode 11.

As illustrated in FIG. 2, the positive electrode 11 includes a rectangular positive electrode current collector 30 and a positive electrode mixture layer 35 that contains a positive electrode active material and a binder and that is formed on the positive electrode current collector 30. The thickness of the positive electrode mixture layer 35 is almost uniform. A suitable example of the positive electrode current collector 30 is a metal foil based on aluminum or an aluminum alloy. The thickness of the positive electrode current collector 30 is 5 μm to 30 μm, for example. In the embodiment, the positive electrode mixture layer 35 is formed on each side of the positive electrode current collector 30 in almost the same pattern.

The positive electrode 11 has an exposed portion 33 where the surface of the positive electrode current collector 30 is exposed. The exposed portion 33 is a portion to which the positive electrode lead 19 is connected and a portion where the surface of the positive electrode current collector 30 is exposed without being covered with the positive electrode mixture layer 35. Hereinafter, the surface of the current collector to which the positive electrode lead 19 is welded is referred to as a "first surface", and a surface of the side opposite to the first surface is referred to as a "second surface" in some cases.

It is preferable that the exposed portion 33 exist on each side of the positive electrode current collector 30 and that such exposed portions overlap in the thickness direction of the current collector. When the positive electrode mixture layer 35 exists in a range that overlaps the exposed portion 33 on the first surface, welding of the positive electrode lead 19 to the exposed portion 33 on the first surface, for example, is obstructed in some cases. Accordingly, the exposed portion 33 is also provided on the second surface. The exposed portion 33 is provided, for example, over the entire width of the positive electrode current collector 30 and has an almost rectangular shape in the front view or the rear view.

The exposed portion 33 may be formed at the end in the longitudinal direction of the positive electrode 11, but is preferably formed in the central portion in the longitudinal direction of the positive electrode 11. For example, the exposed portion 33 is formed at a position almost equidistant from both edges in the longitudinal direction of the positive electrode 11. In this case, the positive electrode lead 19 is connected to the central portion in the longitudinal direction of the positive electrode current collector 30. Consequently, compared with a case in which the positive electrode lead 19 is connected to the end in the longitudinal direction, current collection of the positive electrode 11 is enhanced, thereby contributing to an increased output of a battery. Here, a plurality of exposed portions may exist on the first surface of the positive electrode current collector 30, and a plurality of leads may be welded to the first surface.

The positive electrode mixture layer 35 is suitably formed in almost the entire region excluding the exposed portion 33 on each side of the positive electrode current collector 30. In the embodiment, four linear peripheral edges of the positive electrode current collector 30 are covered with the positive electrode mixture layer 35. The positive electrode mixture layer 35 contains a positive electrode active material, a binder, and an electric conductor, for example. The positive electrode 11 can be fabricated by applying a positive electrode mixture slurry containing a positive electrode active material, a binder, an electric conductor, and a solvent, such as N-methyl-2-pyrrolidone (NMP), to each side of the positive electrode current collector 30 and by compressing the resulting coating films. The thickness of the positive electrode mixture layer 35 is, for example, 50 μm to 100 μm in any of the first to the third regions described hereinafter.

Examples of the positive electrode active material include lithium transition metal oxides containing transition metal elements, such as Co, Mn, and Ni. Such lithium transition metal oxides are not particularly limited, but are preferably complex oxides represented by a general formula of $Li_{1+x}MO_2$ ($-0.2<x\leq0.2$, M includes at least one of Ni, Co, Mn, and Al). Examples of the electric conductor include carbon materials, such as carbon black, acetylene black, Ketjen black, and graphite. These carbon materials may be used alone or in combination.

Examples of the binder include fluororesins, such as polytetrafluoroethylene (PTFE) and polyvinylidene fluoride (PVdF); polyacrylonitrile (PAN); polyimides; acrylic resins; and polyolefins. In addition, these resins may be used together with carboxymethyl cellulose (CMC) or a salt thereof, polyethylene oxide (PEO), or the like. These binders may be used alone or in combination.

In the width direction of the positive electrode 11, the binder content in the positive electrode mixture layer 35 is not uniform, and the binder content has a maximum value at a position 0.5 mm to 5.5 mm away from the edge of the positive electrode current collector 30. Moreover, the maximum value (hereinafter referred to as maximum value ρm) is preferably more than 100% and 240% or less (i.e., $\rho c<\rho m\leq\rho c\times2.4$) of the binder content (hereinafter, referred to as content ρc) at the center in the width direction of the positive electrode mixture layer 35 (corresponding to the center in the width direction of the positive electrode current collector 30 in the embodiment). According to the positive electrode 11 having such a configuration, loss of the mixture layer is suppressed and cycle characteristics of the nonaqueous electrolyte secondary battery 10 are enhanced.

The distribution of a binder in the width direction of the positive electrode mixture layer 35 can be measured by using an electron probe microanalyzer (EPMA). On the basis of the measured results, it is possible to specify a position that exhibits a maximum value of the binder content and to calculate a ratio of the binder content at the position that exhibits the maximum value to the binder content at the center in the width direction of the positive electrode mixture layer 35.

In the positive electrode mixture layer 35, a maximum value ρm of the binder content may exist either on the side of an upper edge 31, which is one edge in the width direction of the positive electrode current collector 30, or on the side of a lower edge 32, which is the other edge in the width direction. Preferably, the maximum value ρm exists at a position 0.5 mm to 5.5 mm away from each edge in the width direction. In other words, in the positive electrode mixture layer 35, a portion with a locally high binder content in the width direction of the positive electrode current collector 30 exist at two positions at the upper end and at the lower end. A maximum value ρm at the upper end and a maximum value at the lower end are preferably the same value, but may be different values.

The binder content in the positive electrode mixture layer 35 more preferably has a maximum value ρm at a position 1 mm to 5 mm away from each edge in the width direction of the positive electrode current collector 30 (upper edge 31 and lower edge 32). Such a maximum value ρm of the binder content exists, for example, at a position 0.5% to 3% of the width of the positive electrode current collector 30 away from the upper edge 31 and the lower edge 32. Further, the maximum value ρm is more preferably 120% to 200% of the binder content ρc (ρc×1.2≤ρm≤ρc×2.0) at the center in the width direction of the positive electrode mixture layer 35.

To the positive electrode 11, an insulating tape (not shown) may be stuck so as to cover the exposed portion 33. The insulating tape is, for example, stuck to the positive electrode lead 19 as well as to the positive electrode mixture layer 35 formed on the right and left sides of the exposed portion 33 while extending thereover.

Figure 3:
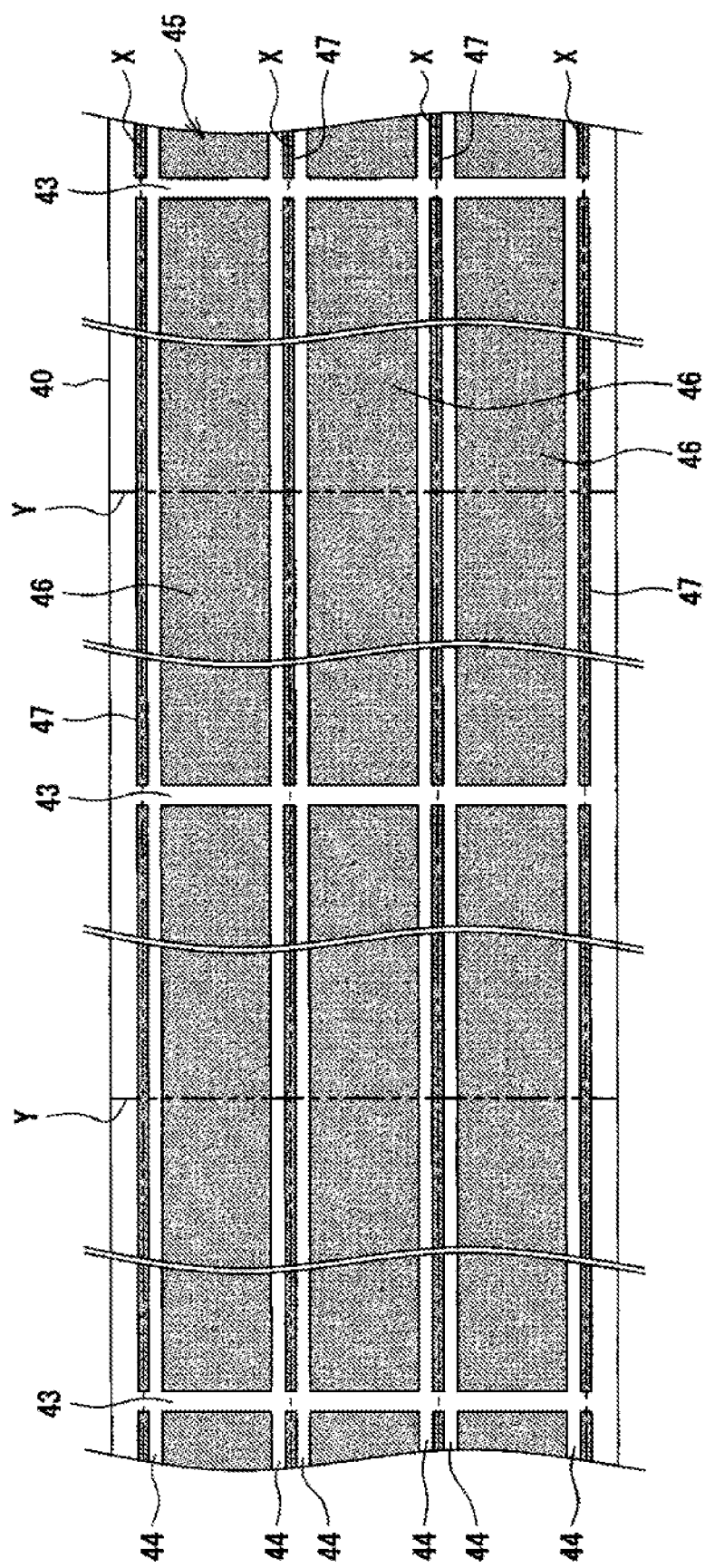
FIG. 3 illustrates a manufacturing method for the positive electrode of the exemplary embodiment.
Figure 4:
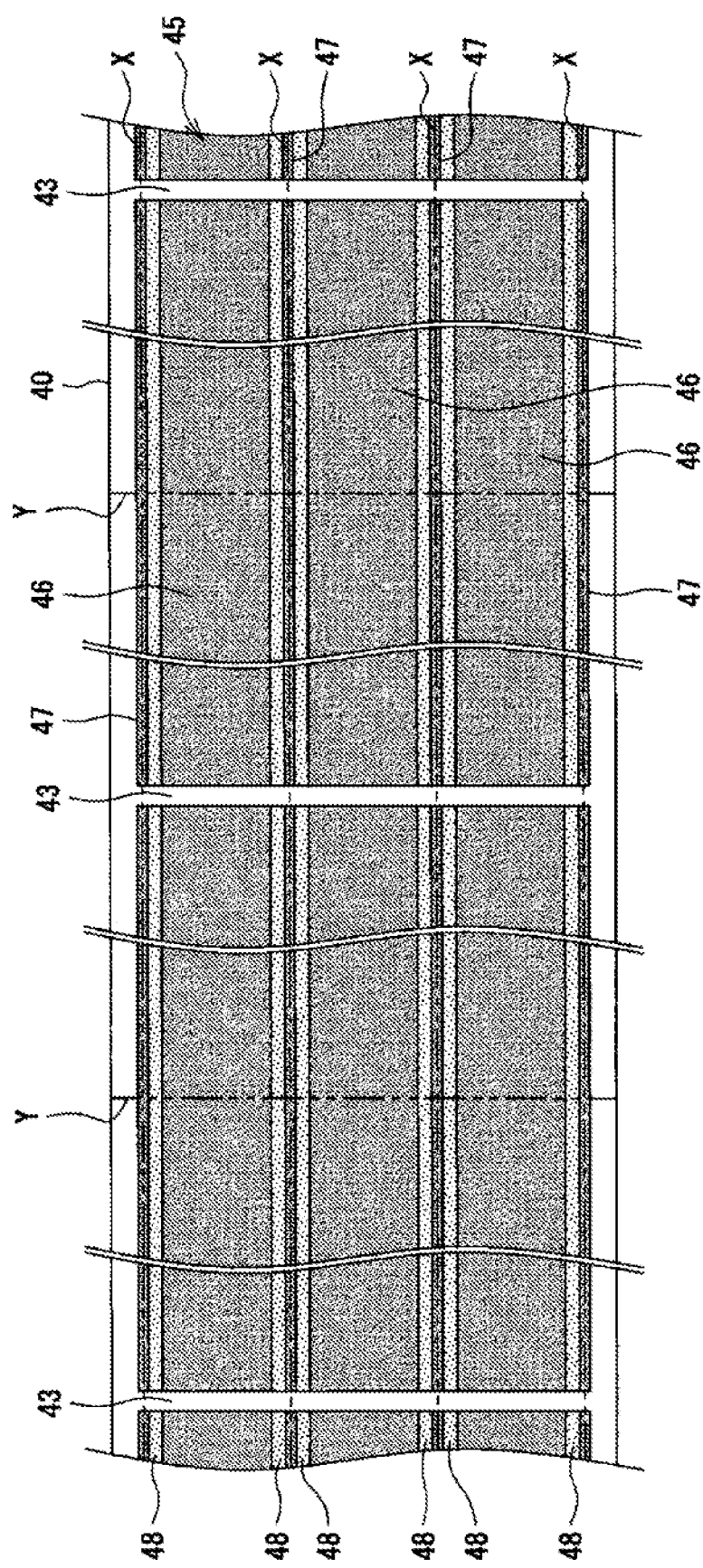
FIG. 4 illustrates the manufacturing method for the positive electrode of the exemplary embodiment.

Here, an exemplary manufacturing method for the positive electrode 11 having the above configuration will be described with reference to FIGS. 3 and 4. As illustrated in FIGS. 3 and 4, the positive electrode 11 is manufactured by forming a positive electrode mixture layer 45 on each side of an elongated current collector 40, followed by cutting of the elongated current collector 40 at planned cutting portions X and Y. The elongated current collector 40 and the positive electrode mixture layer 45 are formed into the positive electrode current collector 30 and the positive electrode mixture layer 35, respectively, by cutting, at the planned cutting portions X and Y, the elongated current collector 40 on which the respective regions of the positive electrode mixture layer 45 have been formed. Each planned cutting portion X in the longitudinal direction of the elongated current collector 40 is located, for example, almost at the center in the width direction of a second region 47.

In the examples illustrated in FIGS. 3 and 4, the positive electrode 11 in which a maximum value ρm of the binder content exists at a position 0.5 mm to 5.5 mm away from each edge in the width direction is obtained by forming the respective regions of the positive electrode mixture layer 45 that have different ratios of the binder content as stripes in the longitudinal direction of the elongated current collector 40. The positive electrode mixture layer 45 includes a first region 46, second regions 47, and third regions 48 formed between the first region 46 and the second regions 47. The third region 48 is a region with a higher binder content per unit area than the first region 46 and the second region 47. In this case, a positive electrode mixture slurry is intermittently applied to each side of the elongated current collector 40 to form coating films of the first regions 46 and the second regions 47 while leaving exposed portions 43 and 44 in which the surface of the current collector is exposed, and subsequently another positive electrode mixture slurry is applied to the exposed portions 44 to form coating films of the third regions 48. The positive electrode mixture layer 45 including the respective regions is prepared, for example, by forming coating films of the respective regions and subsequently compressing all the coating films with a roll press.

The exposed portions 43 are long in the width direction of the elongated current collector 40 and exist at almost constant intervals in the longitudinal direction of the current collector. The exposed portions 44 are formed in the longitudinal direction of the elongated current collector 40 to be almost orthogonal to the exposed portions 43. The width of the exposed portion 43 is 5 mm to 10 mm, for example, and is set to be larger than the width of the positive electrode lead 19. The width of the exposed portion 44 is 0.5 mm to 5 mm, for example. The third regions 48 of the positive electrode mixture layer 45 are formed so as to bury the exposed portions 44. Accordingly, the width of the exposed portion 44 is considered to determine the width of the third region 48.

The positive electrode mixture layer 45 is formed through four slurry application steps in total, or twice for each side of the elongated current collector 40. On either side of the elongated current collector 40, for example, the first regions 46 and the second regions 47 are formed in the first application step, and the third regions 48 are formed in the second application step. In the first and the second application steps, positive electrode mixture slurries that have different contents of solid components, such as a positive electrode active material, a binder, and an electric conductor, are used. Specifically, a ratio of the binder content to the solid component mass of a positive electrode mixture slurry used in the second application step is larger than that of a positive electrode mixture slurry used in the first application step. In each application step, a positive electrode mixture slurry is preferably applied such that the thickness of coating films of each region becomes almost the same.

Here, a binder contained in the third region 48 partially diffuses into the first region 46 and the second region 47 by performing the second application step before the first region 46 and the second region 47 have been dried. Through this procedure, the binder content has a maximum value in the width direction of the positive electrode mixture layer 45. As other methods, a method of applying a solution containing a binder to a predetermined position in a coating film of a positive electrode mixture slurry that has not been dried or immersing the predetermined position in such a solution may also be employed.

The elongated current collector 40 has a width that enables formation of three positive electrodes 11 in the width direction. The first region 46 has a larger width than the second region 47 and is formed, for example, as three stripes at predetermined intervals in the width direction of the elongated current collector 40. The second region 47 is formed as four stripes to sandwich the first region 46 from both sides in the width direction via gaps from the first region 46. Such a gap between the first region 46 and the second region 47 is the exposed portion 44. All the first regions 46, all the second regions 47, and all the third regions 48 that are formed in the respective exposed portions 44 are preferably formed in almost parallel to each other.

The negative electrode 12 includes a rectangular negative electrode current collector and a negative electrode mixture layer formed on the negative electrode current collector. A suitable example of the negative electrode current collector is a metal foil based on copper or a copper alloy. The thickness of the negative electrode current collector is 5 μm to 30 μm, for example. In the embodiment, the negative electrode mixture layer is formed on each side of the negative electrode current collector in almost the same pattern.

It is preferable that an exposed portion of the negative electrode 12 exist on each side of the negative electrode current collector, and such exposed portions overlap in the thickness direction of the current collector. The negative electrode 12 is larger than the positive electrode 11 and has exposed portions almost rectangular in the front view or the rear view at both ends in the longitudinal direction. Negative electrode leads 20 are welded to each exposed portion on either side of the current collector, for example. The negative electrode mixture layer is suitably formed in almost the entire region except for exposed portions on each side of the negative electrode current collector. The negative electrode mixture layer contains a negative electrode active material and a binder, for example. The negative electrode 12 can be fabricated by applying a negative electrode mixture slurry containing a negative electrode active material, a binder, and water to each side of a negative electrode current collector and compressing the resulting coating films.

The negative electrode active material is not particularly limited provided that lithium ions can be reversibly absorbed and released, and carbon materials, such as graphite; metals to be alloyed with lithium, such as Si and Sn; and alloys and oxides thereof are preferably used. As a binder, fluororesins, PAN, polyimides, acrylic resins, polyolefins, and the like may be used as in the case of the positive electrode. When a mixture slurry is prepared by using aqueous solvents, CMC or a salt thereof, styrene-butadiene rubber (SBR), polyacrylic acid (PAA) or a salt thereof, or the like is preferably used. These binders may be used alone or in combination.

A similar configuration to that of the above-described positive electrode 11 is also applicable to the negative electrode 12. The binder content in the negative electrode mixture layer has a maximum value at a position 0.5 to 5.5 mm away from the edge of the negative electrode current collector, for example, and the maximum value is more than 100% and 240% or less of the binder content at the center in the width direction of the mixture layer. In an exemplary embodiment, the binder content in the negative electrode mixture layer has a maximum value at a position 0.5 to 5.5 mm away from at least one of the edges in the width direction of the negative electrode current collector. Alternatively, the binder content in the negative electrode mixture layer may have a maximum value at a position 1 mm to 5 mm away from each edge in the width direction of the negative electrode current collector, and the maximum value may be 120 to 200% of the binder content at the center in the width direction of the negative electrode mixture layer.

EXAMPLES

Hereinafter, the present disclosure will be further described with the Examples. The present disclosure, however, is not limited to these Examples.

Example 1

[Fabrication of Positive Electrode]

A positive electrode mixture slurry A was prepared by mixing 100 parts by mass of lithium cobalt oxide, 1 part by mass of acetylene black, 1 part by mass of polyvinylidene fluoride, and an appropriate amount of N-methyl-2-pyrrolidone. Moreover, a positive electrode mixture slurry B was prepared by mixing 100 parts by mass of lithium cobalt oxide, 1 part by mass of acetylene black, 1.5 parts by mass of polyvinylidene fluoride, and an appropriate amount of N-methyl-2-pyrrolidone.

Subsequently, a positive electrode mixture layer having an almost uniform thickness was formed by applying the positive electrode mixture slurries A and B to each side of an elongated current collector formed from a 15 μm-thick aluminum foil and by compressing the resulting coating films with a roll press such that the thickness of the electrode sheet becomes 140 μm. A positive electrode was obtained by cutting, into a predetermined electrode size, the elongated current collector in which the positive electrode mixture layer had been formed on each side and by welding a positive electrode lead to an exposed portion on one side (first surface) of the current collector.

As illustrated in FIGS. 3 and 4, the positive electrode mixture layer was formed through two slurry application steps to each side of the elongated current collector, or four slurry application steps in total. In the first application step, the positive electrode mixture slurry A was intermittently applied to one side (first surface) of the elongated current collector to form 45 mm-width first regions 46 that extend in the longitudinal direction of the elongated current collector and 5 mm-width second regions 47 that extend in the longitudinal direction. In this step, the positive electrode mixture slurry A was applied so as to form 7 mm-width exposed portions 43 that extend in the width direction of the elongated current collector and 5 mm-width exposed portions 44 that extend in the longitudinal direction. Each exposed portion 44 was formed between the first region 46 and the second region 47.

In the second application step, 5 mm-width third regions 48 were formed by intermittently applying, before the positive electrode mixture slurry A has been dried, the positive electrode mixture slurry B to bury the exposed portions 44 while leaving the exposed portions 43. In a similar manner to the first surface, the slurries A and B were also applied to the other side (second surface) of the elongated current collector to form the first to the third regions of the positive electrode mixture layer. The elongated current collector, on each side of which the positive electrode mixture layer had been formed, was slit at the center in the width direction of each second region to form 60 mm-width positive electrodes. To the positive electrode, an insulating tape was stuck so as to cover each exposed portion entirely.

[Fabrication of Negative Electrode]

A negative electrode mixture slurry was prepared by mixing natural graphite powders, carboxymethyl cellulose (CMC), and styrene-butadiene rubber (SBR) in a weight ratio of 100:1:1 and adding an appropriate amount of water to the resulting mixture. Subsequently, the negative electrode mixture layer having an almost uniform thickness was formed by intermittently applying the negative electrode mixture slurry to each side of an elongated current collector formed from a 10 μm-thick copper foil and by compressing the resulting coating films with a roll press such that the thickness of the electrode sheet becomes 160 μm. Negative electrodes were obtained by cutting the elongated current collector, on each side of which the negative electrode mixture layer has been formed, into a predetermined electrode size and by welding a negative electrode lead to an exposed portion. Here, such an exposed portion was formed at each end in the longitudinal direction of the negative electrode, and one negative electrode lead was welded to each exposed portion. To the negative electrode, an insulating tape was stuck so as to cover each exposed portion entirely.

[Preparation of Nonaqueous Electrolyte]

Ethylene carbonate (EC) and ethyl methyl carbonate (EMC) were mixed in a volume ratio of 30:70. A nonaqueous electrolyte was prepared by dissolving lithium hexafluorophosphate ($LiPF_6$) at a concentration of 1 mol/L in the resulting mixed solvent.

[Fabrication of Battery]

A rolled electrode assembly was fabricated by spirally rolling the above-described positive electrode and negative electrode via a polyethylene separator. The electrode assembly was housed in a flat-bottomed cylindrical metal case body, and an upper end of the positive electrode lead and lower ends of the negative electrode leads were respectively welded to a bottom plate of a seal and to a bottom inner surface of the case body. A cylindrical battery was fabricated by feeding the above-described nonaqueous electrolyte into the case body and sealing an opening of the case body with the seal via a polypropylene gasket. Here, each insulating plate was disposed on the upper side and the lower side of the electrode group.

Example 2

A cylindrical battery was fabricated in a similar manner to Example 1 except for applying the positive electrode mixture slurry A to form 51 mm-width first regions 46, 3 mm-width second regions 47, and 3 mm-width exposed portions 44.

Example 3

A cylindrical battery was fabricated in a similar manner to Example 1 except for applying the positive electrode mixture slurry A to form 57 mm-width first regions 46, 1 mm-width second regions 47, and 1 mm-width exposed portions 44.

Example 4

A cylindrical battery was fabricated in a similar manner to Example 1 except for changing the amount of polyvinylidene fluoride added in the positive electrode mixture slurry A to 1.2 parts by mass.

Example 5

A cylindrical battery was fabricated in a similar manner to Example 2 except for changing the amount of polyvinylidene fluoride added in the positive electrode mixture slurry A to 1.2 parts by mass.

Example 6

A cylindrical battery was fabricated in a similar manner to Example 3 except for changing the amount of polyvinylidene fluoride added in the positive electrode mixture slurry A to 1.2 parts by mass.

Example 7

A cylindrical battery was fabricated in a similar manner to Example 1 except for changing the amount of polyvinylidene fluoride added in the positive electrode mixture slurry A to 2.0 parts by mass.

Example 8

A cylindrical battery was fabricated in a similar manner to Example 2 except for changing the amount of polyvinylidene fluoride added in the positive electrode mixture slurry A to 2.0 parts by mass.

Example 9

A cylindrical battery was fabricated in a similar manner to Example 3 except for changing the amount of polyvinylidene fluoride added in the positive electrode mixture slurry A to 2.0 parts by mass.

Comparative Example 1

The positive electrode mixture slurry A was intermittently applied while leaving exposed portions 43 to form a positive electrode mixture layer on the entire current collector except for the exposed portions 43. A cylindrical battery was fabricated in a similar manner to Example 1 in other aspects.

Comparative Example 2

A cylindrical battery was fabricated in a similar manner to Example 1 except for applying the positive electrode mixture slurry A to form 55 mm-width first regions 46 and 5 mm-width exposed portions 44 without forming the second regions. The positive electrode of Comparative Example 2 has the configuration illustrated in FIG. 5.

Comparative Example 3

A cylindrical battery was fabricated in a similar manner to Example 1 except for applying the positive electrode mixture slurry A to form 42 mm-width first regions 46, 6 mm-width second regions 47, and 6 mm-width exposed portions 44.

Comparative Example 4

A cylindrical battery was fabricated in a similar manner to Example 3 except for changing the amount of polyvinylidene fluoride added in the positive electrode mixture slurry A to 2.5 parts by mass.

The positive electrodes and cylindrical batteries of the above-described Examples and Comparative Examples were evaluated for the binder content in the positive electrode mixture layer and for cycle characteristics by the methods described hereinafter. Here, cycle characteristics were evaluated for good-quality batteries, for example, without loss of the active material.

[Evaluation of Binder Content]

The binder content in the positive electrode mixture layer was measured by using an electron probe microanalyzer (EPMA) at positions 0 mm, 1 mm, 3 mm, 5 mm, 6 mm, and 30 mm (the center in the width direction) away from one edge in the width direction of the positive electrode current collector. The binder content at each position in the mixture layer was calculated as a percentage relative to 100% of the binder content at the center in the width direction of the mixture layer. The results are shown in Table 1.

[Evaluation of Cycle Characteristics]

A cycle under an environment at 25° C. that includes charging at 1.25 A to a battery voltage of 4.1 V, further charging by gradually decreasing a charging current to 20 mA while maintaining a battery voltage of 4.1 V, and subsequently discharging at 1.25 A to a battery voltage of 2.75 V was repeated 500 times. The percentage of an initial discharge capacity to a discharge capacity after 500 cycles was calculated, and the results are shown in Table 1.

TABLE 1

| | Binder content in mixture layer (%) | | | | | Cycle Characteristics |
|---|---|---|---|---|---|---|
| | 0 mm | 1 mm | 3 mm | 5 mm | 6 mm | (%) |
| Ex. 1 | 100 | 100 | 120 | 150 | 130 | 88 |
| Ex. 2 | 100 | 120 | 150 | 120 | 100 | 86 |
| Ex. 3 | 130 | 150 | 120 | 100 | 100 | 85 |
| Ex. 4 | 100 | 100 | 110 | 120 | 115 | 91 |
| Ex. 5 | 100 | 110 | 120 | 110 | 100 | 89 |
| Ex. 6 | 115 | 120 | 110 | 100 | 100 | 88 |
| Ex. 7 | 120 | 130 | 160 | 200 | 180 | 86 |
| Ex. 8 | 140 | 160 | 200 | 160 | 140 | 84 |

TABLE 1-continued

| | Binder content in mixture layer (%) | | | | | Cycle Characteristics |
|---|---|---|---|---|---|---|
| | 0 mm | 1 mm | 3 mm | 5 mm | 6 mm | (%) |
| Ex. 9 | 180 | 200 | 160 | 130 | 120 | 83 |
| Comp. Ex. 1 | 100 | 100 | 100 | 100 | 100 | 72 |
| Comp. Ex. 2 | 150 | 130 | 100 | 100 | 100 | 57 |
| Comp. Ex. 3 | 100 | 100 | 100 | 130 | 150 | 74 |
| Comp. Ex. 4 | 150 | 180 | 220 | 250 | 230 | 52 |

As shown in Table 1, the batteries of Examples 1 to 9 have excellent cycle characteristics compared with the batteries of Comparative Examples 2 and 4. When a high binder content region in the mixture layer is formed at the edge of the electrode (Comparative Example 2) and when the binder content in the mixture layer at a position 5 mm away from the edge of the electrode is 250% of the binder content at the center in the width direction of the mixture layer (Comparative Example 4), the electrolyte solution is presumably less likely to permeate inside the electrode assembly, thereby significantly impairing cycle characteristics.

Moreover, the batteries of Examples 1 to 9 have excellent cycle characteristics compared with the batteries of Comparative Examples 1 and 3. In the Examples 1 to 9, by providing a high binder content region in the mixture layer at a position 1 mm to 5 mm away from the edge of the current collector, the retention of the electrolyte solution that has permeated inside the electrode assembly is presumably enhanced, thereby further improving cycle characteristics compared with Comparative Examples 1 and 3. The positive electrodes of Examples 1 to 9 are less likely to cause loss of the mixture layer in the cutting step of the electrode, compared with the positive electrodes of the Comparative Examples 1 and 3.

In the above-described Examples, a positive electrode in which a positive electrode mixture layer is formed extending over both edges in the longitudinal direction of the positive electrode current collector and the binder content has a maximum value at the upper end and at the lower end of the positive electrode current collector was used. However, a positive electrode in which the binder content has a maximum value at at least one of the upper end or the lower end may also be used. When a difference in length between the longitudinal direction and the width direction of the positive electrode is large as in a rolled electrode assembly, the binder content preferably has a maximum value at at least one of the ends in the longitudinal direction. However, a positive electrode in which the binder content has a maximum value at at least one of the ends in the width direction of the positive electrode current collector may also be used.

REFERENCE SIGNS LIST

10 Nonaqueous electrolyte secondary battery
11 Positive electrode
12 Negative electrode
13 Separator
14 Electrode assembly
15 Case body
16 Seal
17, 18 Insulating plate
19 Positive electrode lead
20 Negative electrode lead
21 Overhang
22 Filter
23 Lower valve
24 Insulator
25 Upper valve
26 Cap
27 Gasket
30 Positive electrode current collector
31 Upper edge
32 Lower edge
33, 43, 44 Exposed portion
35, 45 Positive electrode mixture layer
40 Elongated current collector
46 First region
47 Second region
48 Third region

The invention claimed is:

1. An electrode for a nonaqueous electrolyte secondary battery, comprising a rectangular current collector and a mixture layer that contains an active material and a binder and that is formed on the current collector, wherein: the mixture layer covers at least one edge of four linear peripheral edges of the current collector; the binder content in mass % in the mixture layer has a maximum value at a position 0.5 mm to 55 mm away from the one edge in a second direction that is perpendicular to a first direction along the one edge; the maximum value is more than 100% and 240% or less of the binder content in mass % in the mixture layer at the center in the second direction of the mixture layer; and wherein the first direction is a longitudinal direction of the current collector, and the second direction is a width direction of the current collector.

2. The electrode for a nonaqueous electrolyte secondary battery according to claim 1 wherein the maximum value is 120% to 200% of the binder content in mass % in the mixture layer at the center in the width direction of the mixture layer.

3. The electrode for a nonaqueous electrolyte secondary battery according to claim 1 wherein the binder content in mass % in the mixture layer has the maximum value at a position 1 mm to 5 mm away from the one edge.

4. A nonaqueous electrolyte secondary battery comprising an electrode assembly formed by stacking a positive electrode and a negative electrode via a separator, wherein at least one of the positive electrode or the negative electrode is formed from the electrode for a nonaqueous electrolyte secondary battery according to claim 1.

* * * * *